US011558879B2

(12) United States Patent
Ludwig et al.

(10) Patent No.: US 11,558,879 B2
(45) Date of Patent: *Jan. 17, 2023

(54) HANDLING NETWORK TRAFFIC VIA A FIXED ACCESS

(71) Applicant: Telefonaktiebolaget LM Ericsson (publ), Stockholm (SE)

(72) Inventors: Reiner Ludwig, Hürtgenwald (DE); Hannes Ekström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/186,617

(22) Filed: Feb. 26, 2021

(65) Prior Publication Data

US 2021/0185697 A1  Jun. 17, 2021

Related U.S. Application Data

(63) Continuation of application No. 16/522,891, filed on Jul. 26, 2019, now Pat. No. 10,939,456, which is a
(Continued)

(51) Int. Cl.
*H04W 4/00* (2018.01)
*H04W 72/10* (2009.01)
(Continued)

(52) U.S. Cl.
CPC ......... *H04W 72/10* (2013.01); *H04L 47/2433* (2013.01); *H04L 47/2441* (2013.01); *H04W 28/10* (2013.01)

(58) Field of Classification Search
CPC ............... H04W 72/042; H04W 76/27; H04W 72/0446; H04W 72/10; H04W 28/10;
(Continued)

(56) References Cited

U.S. PATENT DOCUMENTS 6,286,052 B1    9/2001  McCloghrie et al.
7,050,396 B1 *  5/2006  Cohen ................. H04L 12/2854
                                                        370/235
(Continued)

FOREIGN PATENT DOCUMENTS

EP        1720287 A1    11/2006
JP     2002215481 A     8/2002
(Continued)

OTHER PUBLICATIONS

3rd Generation Partnership Project, "3rd Generation Partnership Project; Technical Specification Group Services and System Aspects; Policy and charging control architecture (Release 7)", Technical Specification, 3GPP TS 23.203 V7.5.0, Dec. 1, 2007, pp. 1-72, 3GPP, France.

(Continued)

*Primary Examiner* — Atique Ahmed
(74) *Attorney, Agent, or Firm* — Coats & Bennett, PLLC

(57) ABSTRACT

For efficiently handling network traffic via a fixed access, classification of UL data traffic in a communication device may be accomplished in a reflective mode by detecting identifiers of outgoing uplink data packets which are complementary to identifiers of incoming downlink data packets. The downlink data packets are already assigned to the traffic classes. The outgoing uplink data packets carrying the complementary identifier are assigned to the same traffic class as the incoming downlink data packets. For this purpose, the communication device is provided with a traffic classificator. In the reflective mode, the traffic classificator locally generates uplink packet classification rules by monitoring received downlink data packets.

19 Claims, 9 Drawing Sheets

Related U.S. Application Data continuation of application No. 13/811,494, filed as application No. PCT/EP2010/061071 on Jul. 29, 2010, now Pat. No. 10,492,207.

(51) Int. Cl.
  *H04L 47/2425* (2022.01)
  *H04L 47/2441* (2022.01)
  *H04W 28/10* (2009.01)

(58) Field of Classification Search
  CPC . H04L 5/0053; H04L 5/0007; H04L 47/2433; H04L 47/2441
  See application file for complete search history.

(56) References Cited

U.S. PATENT DOCUMENTS

| | | |
|---|---|---|
| 7,272,651 B1 | 9/2007 | Bolding et al. |
| 7,283,468 B1 | 10/2007 | Hill et al. |
| 9,252,972 B1 | 2/2016 | Dukes et al. |
| 2002/0006133 A1 | 1/2002 | Kakemizu |
| 2002/0099854 A1 | 7/2002 | Jorgensen |
| 2002/0133617 A1 | 9/2002 | Davies |
| 2002/0143939 A1 | 10/2002 | Riddle et al. |
| 2003/0014764 A1* | 1/2003 | Saladino ............... H04L 65/70 725/111 |
| 2003/0128708 A1 | 7/2003 | Inoue et al. |
| 2004/0017825 A1 | 1/2004 | Stanwood et al. |
| 2004/0109455 A1 | 6/2004 | Jouppi et al. |
| 2004/0228356 A1 | 11/2004 | Adamczyk et al. |
| 2004/0240447 A1 | 12/2004 | Dorbolo et al. |
| 2004/0252698 A1 | 12/2004 | Anschutz et al. |
| 2005/0018697 A1* | 1/2005 | Enns ..................... H04L 1/004 348/E7.07 |
| 2005/0021716 A1* | 1/2005 | Adamczyk ........... H04L 12/287 709/223 |
| 2005/0243837 A1* | 11/2005 | Boyd ................ H04Q 11/0067 370/395.52 |
| 2006/0028980 A1 | 2/2006 | Wright |
| 2006/0039313 A1 | 2/2006 | Chou et al. |
| 2006/0072595 A1* | 4/2006 | Broberg ............. H04L 12/4633 370/410 |
| 2006/0077989 A1 | 4/2006 | Lu et al. |
| 2006/0103862 A1 | 5/2006 | Kurumisawa et al. |
| 2006/0153080 A1 | 7/2006 | Palm |
| 2006/0164969 A1 | 7/2006 | Malik et al. |
| 2006/0218302 A1 | 9/2006 | Chia et al. |
| 2007/0081499 A1 | 4/2007 | Johnsen |
| 2007/0104132 A1 | 5/2007 | Rajagopalan et al. |
| 2007/0127487 A1* | 6/2007 | Kim ....................... H04J 3/1694 370/468 |
| 2007/0242627 A1 | 10/2007 | Thai et al. |
| 2007/0249339 A1 | 10/2007 | Tamura et al. |
| 2007/0297329 A1 | 12/2007 | Part et al. |
| 2008/0002592 A1 | 1/2008 | Yegani et al. |
| 2008/0008159 A1* | 1/2008 | Bourlas ................. H04L 69/32 370/352 |
| 2008/0076432 A1 | 3/2008 | Senarath et al. |
| 2008/0089324 A1 | 4/2008 | Polk et al. |
| 2008/0107084 A1 | 5/2008 | Pichna et al. |
| 2008/0267085 A1 | 10/2008 | Bae et al. |
| 2008/0310334 A1 | 12/2008 | Nakamura et al. |
| 2009/0016282 A1 | 1/2009 | Gasparroni et al. |
| 2009/0122736 A1 | 5/2009 | Damnjanovic et al. |
| 2009/0193469 A1 | 7/2009 | Igarashi |
| 2009/0238135 A1 | 9/2009 | De et al. |
| 2009/0238192 A1 | 9/2009 | Dolganow et al. |
| 2010/0067400 A1 | 3/2010 | Dolganow et al. |
| 2010/0103862 A1 | 4/2010 | Ulupinar et al. |
| 2010/0115072 A1 | 5/2010 | Payyappilly et al. |
| 2010/0142373 A1 | 6/2010 | Jin et al. |
| 2010/0157831 A1 | 6/2010 | Takeuchi et al. |
| 2010/0254399 A1 | 10/2010 | Shin et al. |
| 2010/0268763 A1 | 10/2010 | Rasanen |
| 2010/0278190 A1* | 11/2010 | Yip ..................... H04L 49/90 370/412 |
| 2011/0035495 A1 | 2/2011 | Ekstrom et al. |
| 2011/0090794 A1 | 4/2011 | Cherian et al. |
| 2011/0246586 A1 | 10/2011 | Steele |
| 2011/0264726 A1 | 10/2011 | Zabawskyj et al. |
| 2011/0286331 A1 | 11/2011 | Lauer |
| 2011/0314145 A1 | 12/2011 | Raleigh et al. |
| 2012/0076047 A1 | 3/2012 | Turanyi et al. |
| 2012/0101952 A1 | 4/2012 | Raleigh et al. |
| 2012/0243547 A1 | 9/2012 | Pardo-Blazquez et al. |

FOREIGN PATENT DOCUMENTS

| | | |
|---|---|---|
| JP | 2003209573 A | 7/2003 |
| JP | 2006503501 A | 1/2006 |
| JP | 2008311974 A | 12/2008 |
| JP | 2010166141 A | 7/2010 |
| WO | 2004036849 A2 | 4/2004 |
| WO | 2007079773 A1 | 7/2007 |
| WO | 2007087828 A1 | 8/2007 |
| WO | 2007102550 A1 | 9/2007 |
| WO | 2008102442 A1 | 8/2008 |
| WO | 2010074619 A1 | 7/2010 |
| WO | 2010112077 A1 | 10/2010 |

OTHER PUBLICATIONS

Dslhome-Technical Working Group, "CPE WAN Management Protocol", Technical Report, DSL Forum, TR-069, May 1, 2004, pp. 1-109. Retrieved on Jan. 13, 2015, retrieved from internet:https://www.broadband-forum.org/ . . . /TR-069.pdf.

Cisco Systems, Inc., "WAN and Application Optimization Solution Guide," Cisco Validated Design, Document Version 1.1, Aug. 2008, San Jose, CA, Chapter 5, Traffic Classification, pp. 5-1 to 5-11.

3rd Generation Partnership Project, "Technical Specification Group Services and System Aspects; Policy and charging control architecture (Release 9)," Technical Specification, 3GPP TS 23.203, v9.0.0, Mar. 2009, Valbonne, France, pp. 1-113.

\* cited by examiner

| IDENTIFIER | | | | |
|---|---|---|---|---|
| SOURCE ADDRESS | DESTINATION ADDRESS | SOURCE PORT | DESTINATION PORT | PROTOCOL ID |
| A | B | C | D | X |

| COMPLEMENTARY IDENTIFIER | | | | |
|---|---|---|---|---|
| SOURCE ADDRESS | DESTINATION ADDRESS | SOURCE PORT | DESTINATION PORT | PROTOCOL ID |
| B | A | D | C | X |

FIG. 7

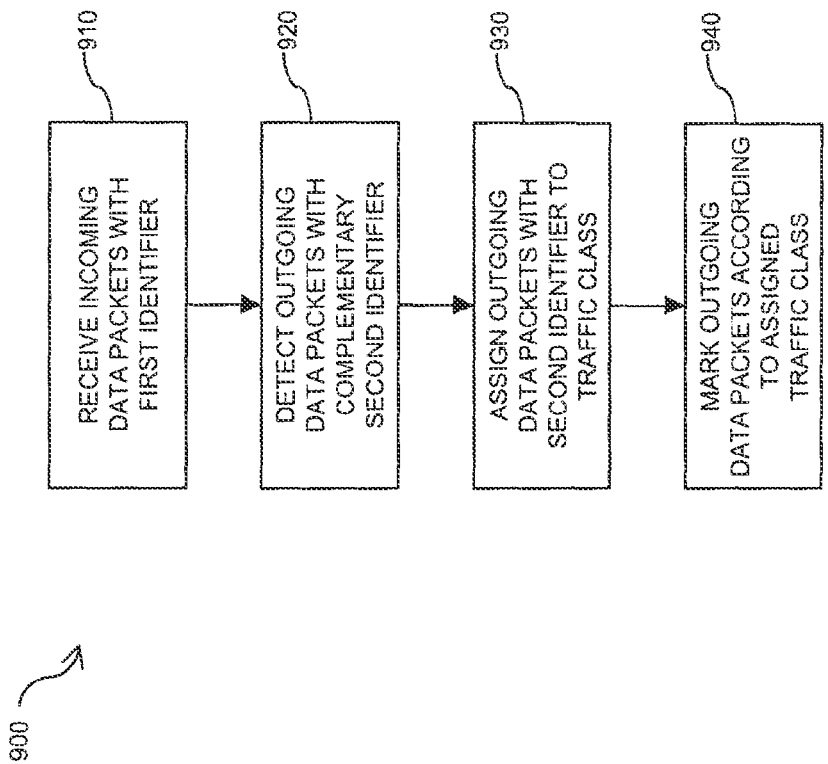

HANDLING NETWORK TRAFFIC VIA A FIXED ACCESS

RELATED APPLICATIONS

This application is a continuation of prior application Ser. No. 16/522,891, filed 26 Jul. 2019, which is a continuation of application Ser. No. 13/811,494, filed 12 Feb. 2013, patented as U.S. patent Ser. No. 10/492,207, which was the National Stage of International Application PCT/EP2010/061071 filed 29 Jul. 2010, the entire disclosure of each being hereby incorporated by reference herein.

TECHNICAL FIELD

The present invention relates to methods and devices for handling network traffic via a fixed access.

BACKGROUND

In communication networks, traffic separation is a concept which allows that different types of packet traffic receive different treatment in user plane traffic forwarding functions, e.g. with respect to queuing, scheduling error control, or the like. For implementing traffic separation, an edge node may classify packets into different traffic classes, e.g. voice traffic, multimedia traffic or internet traffic. On the basis of this traffic classification, the data packets may be provided with a marking which allows a user plane traffic forwarding function to associate the data packets with the respective traffic class and associated forwarding treatment.

If the edge node is a residential gateway communicating the data traffic with the network via a fixed access, e.g. using Digital Subscriber Line (DSL) or coaxial cable technology, it is known to accomplish traffic classification in the uplink direction, i.e. from the residential gateway to the network, on the basis of port mapping. In this case, the residential gateway is provided with multiple physical ports which are each dedicated to a certain type of end device, e.g. a voice port for connecting to a fixed phone, a TV port for connecting to a digital TV or to a digital set-top box, and an internet port for connecting to a computer or other type of multipurpose internet device. The internet port may also be coupled to an access point of a Wireless Local Area Network (WLAN), sometimes also referred to as a WiFi access point. In such a scenario, all traffic received in the voice port may be classified as voice traffic, all traffic received on the TV port may be classified as multimedia traffic, and all traffic received on the internet port may be classified as internet traffic. The data packets of the classified traffic may then be provided with the corresponding marking to be used in the uplink transmission via the fixed access.

As an alternative, the traffic classification may be based on a semi-static configuration of the residential gateway. For example, all data traffic sent to a certain Internet Protocol (IP) address or to a certain IP address range may be assigned to a certain traffic class. This approach may also be applied when the edge node is a mobile terminal communicating with a fixed access node using wireless access technology. Further, classification rules could be signaled from the network to the edge node.

However, using the above concepts of accomplishing traffic classification it may be difficult for a network operator to efficiently manage a large number of edge nodes in such a way that traffic classification is accomplished in a desired manner.

Accordingly, there is a need for powerful and efficient techniques for handling network traffic via a fixed access.

SUMMARY

According to an embodiment of the invention, a method of handling network traffic in a communication device is provided. According to the method, incoming data packets are received via a fixed access in the communication device. The data packets include a first identifier and are assigned to a traffic class. In outgoing data packets to be transmitted via the fixed access from the communication device, data packets including a second identifier which is complementary with respect to said first identifier are detected. The detected outgoing data packets having said second identifier are assigned to the same traffic class as the incoming data packets having said first identifier.

According to a further embodiment of the invention, a communication device is provided. The communication device includes an interface configured to receive incoming data packets via a fixed access from a network and an interface configured to send outgoing data packets via the fixed access to the network. The communication device further includes a traffic classificator. The traffic classificator is configured to detect incoming data packets including a first identifier and outgoing data packets including a second identifier which is complementary to said first identifier. In addition, the traffic classificatory is configured to assign said outgoing data packets having said complementary second identifier to the same traffic class as the incoming data packets having the first identifier.

According to further embodiments of the invention, other methods or devices may be provided. Also, according an embodiment of the invention, a computer program product may be provided, which comprises program code that, when executed by a processor of a communication device, causes the communication device to operate in accordance with the above method.

BRIEF DESCRIPTION OF THE DRAWINGS

FIG. 7 schematically illustrates a protocol frame supporting tagging of data packets.

FIG. 9 shows a flowchart for illustrating a method of handling UL data traffic according to an embodiment of the invention.

DETAILED DESCRIPTION OF EMBODIMENTS

In the following, the invention will be explained in more detail by referring to exemplary embodiments and to the accompanying drawings. The illustrated embodiments relate to handling of uplink (UL) data traffic of a communication device, i.e. data traffic from the communication device to a communication network. The communication network provides an access via a fixed access, i.e. implemented using DSL access technology, optical access technology or coaxial cable access technology. In addition, the communication network may also provide an access via a radio access node of a cellular mobile radio network. For example, the cellular mobile radio network may be implemented according to the 3GPP (Third Generation Partnership Project) technical specifications, e.g. as a Global System for Mobile Communications (GSM) network, as a Universal Mobile Telecommunications System (UMTS) network, or as a Service Architecture Evolution (SAE)/Long Term Evolution (LTE) network. However, it is to be understood that the concepts as described herein may also be applied to other types of communication networks. The embodiments as described herein accomplish UL traffic classification on the basis of UL traffic classification rules which are locally generated by monitoring downlink (DL) data traffic, in particular information in protocol headers of DL data packets.

Figure 1:
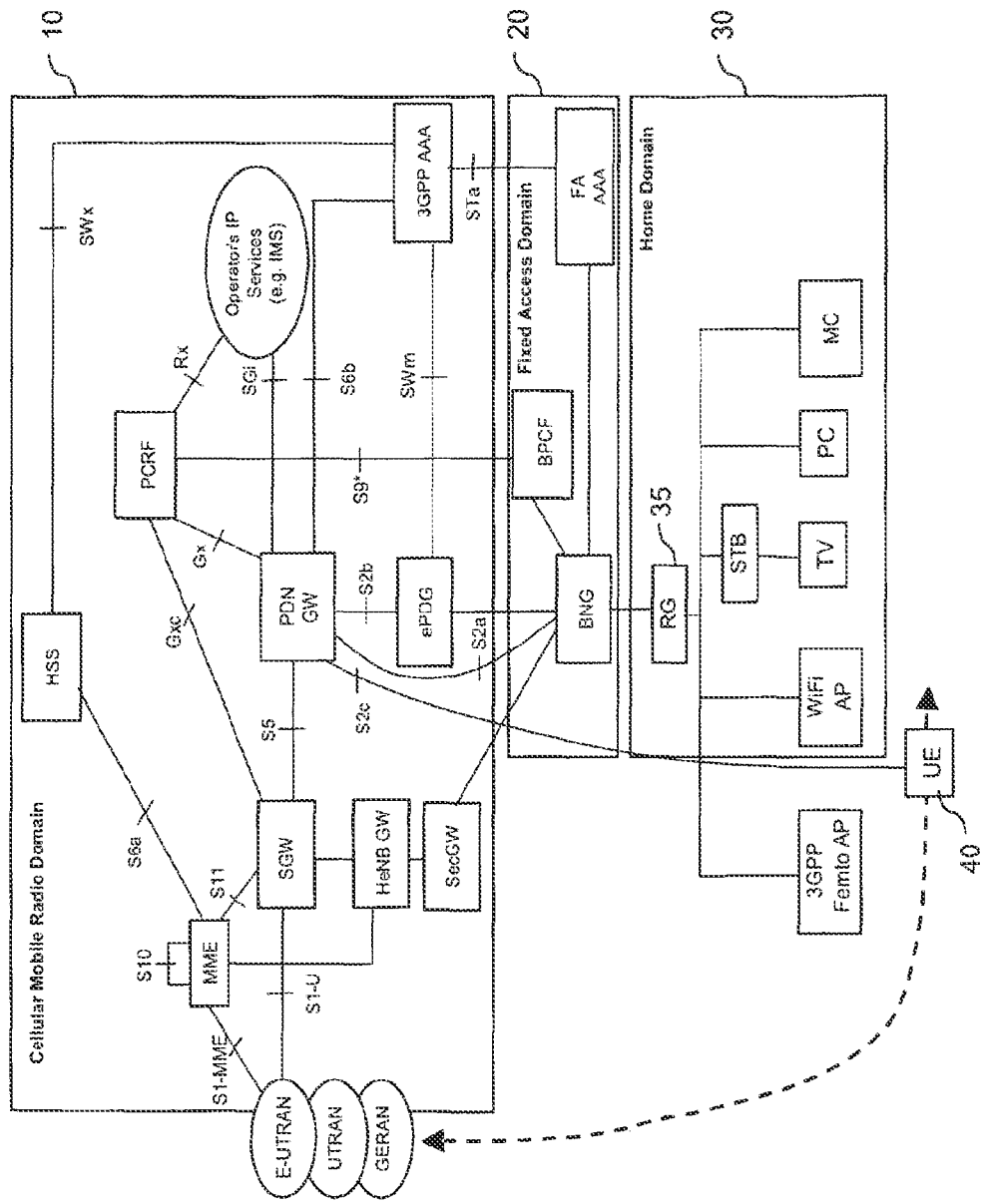
FIG. 1 schematically illustrates a communication network environment in which concepts according to embodiments of the invention may be applied.

FIG. 1 schematically illustrates a communication network environment in which concepts according to embodiments of the invention may be applied. As illustrated, the communication network environment includes a cellular mobile radio network domain 10 according to the 3GPP technical specifications. Further, a fixed access domain 20 is provided. In addition, the communication network environment includes a home domain 30, which includes various subscriber premises devices coupled to the fixed access domain 20. Components of the home domain 30 are typically located at the subscriber premises site. In the home domain, a residential gateway (RG) 35 is provided, which is a communication device at the subscriber premises site, which is used to couple the subscriber premises devices to the fixed access domain 20. In particular, the RG 35 may couple a local area network (LAN) at the subscriber premises site to the fixed access domain 20 of the communication network.

In the illustrated example, the cellular mobile radio network domain 10 is implemented according to 3GPP SAE/LTE. As illustrated, the cellular mobile radio network domain 10 includes a Packet Data Network Gateway (PDN GW) which is coupled to Radio Access Networks (RANs) via a Serving Gateway (SGW). As illustrated, the RANs may include one or more GSM EDGE RAN (GERAN), UMTS Terrestrial RAN (UTRAN) or Evolved UTRAN (E-UTRAN). In the cellular mobile radio network domain 10, operator's IP services, e.g. IP Multimedia Subsystem (IMS) services, may be hosted by application servers or the like. A mobile terminal or user equipment (UE) 40, e.g. a mobile phone, a portable computer or the like, may access the operator's IP services via the PDN GW.

In addition, the cellular mobile radio network domain 10 includes control nodes, such as a Policy and Charging Rules Function (PCRF) and a Mobility Management Entity (MME), a subscriber database in the form of a Home Subscriber Server (HSS), and a 3GPP Authentication, Authorization and Accounting (AAA) server.

Further, for supporting the 3GPP Femto access technology, the cellular mobile radio network domain 10 includes a Home eNodeB Gateway (HeNB GW) and a Security Gateway (Sec GW). For coupling to non-3GPP network domains, e.g. to the fixed access domain 20, the cellular mobile radio network domain 10 further includes an Evolved Packet Data Gateway (ePDG). Further details concerning the above components of the cellular mobile radio network domain 10 and the interfaces provided between these components can be taken from the 3GPP technical specifications.

The fixed access domain 20 includes operator infrastructure for providing fixed access to the communication network, e.g. using DSL access technology, optical access technology, or coaxial cable access technology. For this purpose, a Broadband Network Gateway (BNG) is provided, which communicates with the ePDG and/or the PDN GW in the cellular mobile radio network domain 10. Further, the BNG communicates with the RG 35 in the home domain 30 using fixed, e.g wire-based or cable based, communication links. Depending on the access technology used with respect to the RG 35, the fixed access domain 20 may be provided with a corresponding access node, e.g. a DSL Access Multiplexer (DSLAM), an Optical Network Terminal (ONT), or a coaxial cable head end.

Further, the fixed access domain 20 includes a policy control node in the form of a Broadband Policy and Charging Function (BPCF) and a Fixed Access (FA) Authentication, Authorization and Accounting (AAA) server. The policy control node in the cellular mobile radio network domain 10, i.e the PCRF, communicates with the policy control node in the fixed access domain 20, i.e. the BPCF. Further, the 3GPP AAA server communicates with the FA AAA server. In addition, the BNG in the fixed access domain 20 communicates with the Sec GW in the cellular mobile radio network domain 10. In this way, trusted interworking between the cellular mobile radio network domain 10 and the fixed access domain 20 is possible.

The home domain 30 includes the RG 35 and a number of subscriber premises devices connected thereto. In the illustrated example, the subscriber premises devices include a digital entertainment device in the form of a Media Center (MC), a multipurpose computing device in the form of a Personal Computer (PC), a television set (TV) coupled to the RG 35 via a Set-Top-Box (STB), and wireless access points, in particular a WiFi Access Point (AP), and a 3GPP Femto Access Point (AP).

In the communication network environment of FIG. 1, the UE 40 may move between accesses in the cellular mobile radio network domain 10, e.g. using GERAN, UTRAN or E-UTRAN, and between accesses via the fixed access domain 20, e.g. via the 3GPP Femto AP or the WiFi AP. This is illustrated by the dashed arrow.

Figure 2:
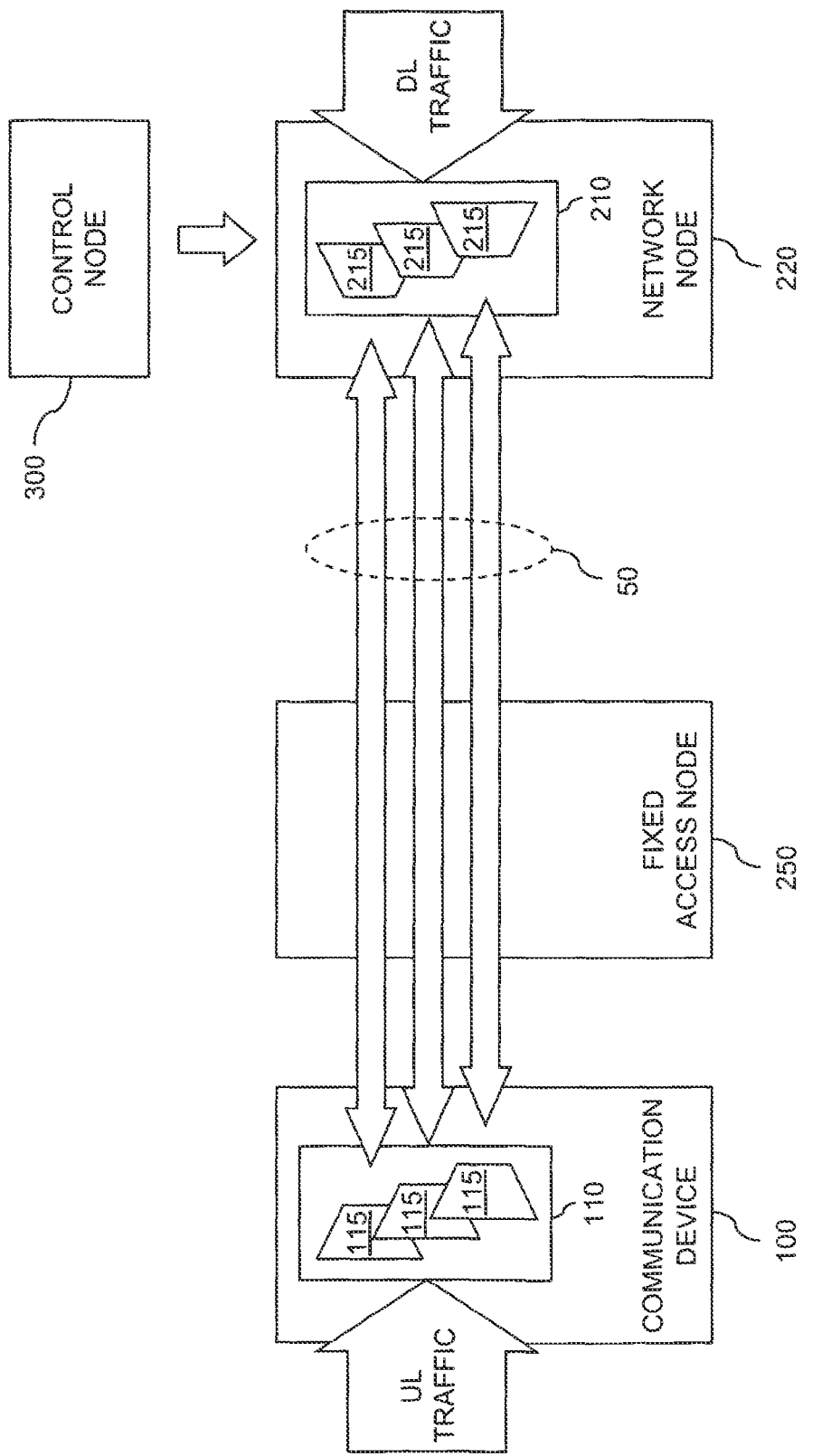
FIG. 2 schematically illustrates a communication system in which concepts according to embodiments of the invention may be applied.

FIG. 2 schematically illustrates a communication system in which UL data traffic is handled in accordance with an embodiment of the invention. The communication system includes a communication device 100, a fixed access node 250, and a network node 220. In addition, the communication system includes a control node 300. The illustrated communication system may be part of the communication network environment of FIG. 1. For example, the communication device 100 may correspond to the UE 40 or to the RG 35. The network node 220 may correspond to the BNG or the PDN GW. If the communication device 100 corresponds to the RG 35, the fixed access node 250 may be any type of access node coupled between the BNG and the RG 35 so as to implement the fixed access between the BNG and the RG. The fixed access node 250 may also be integrated in the BNG or in the RG 35. By way of example, the fixed access node 250 may be implemented by a DSLAM, an ONT, a cable modem, or the like. The fixed access node 250 may be located in the fixed access domain 20 or in the home domain 30. If the communication device 100 corresponds to the UE 40, the fixed access node may also be the RG 35. Accordingly, the communication device 100 may be a UE coupled to the network node 220 via a residential gateway or may be a residential gateway itself. The residential gateway has a fixed communication link to the network node, while a communication link between the UE and the residential gateway may be wireless. The residential gateway is typically authenticated using the fixed communication link to the network node 220, which for this purpose may communicate with an authentication server, e.g. the FA AAA server of FIG. 1. If a UE is connected via the residential gateway to the network node 220, independent authentication of the UE in a fixed access domain is then not necessary. The control node 300 may be the BPCF or the PCRF.

As further illustrated, the communication device 100 and the network node 220 communicate data packets in the DL direction and the UL direction. The data packets are assigned to different traffic classes 50, which is schematically illustrated by separate double headed arrows. The traffic classes may be, e.g., voice traffic, multimedia traffic, and internet traffic. For each of the traffic classes 50 a corresponding forwarding treatment in intermediate nodes, e.g. the fixed access node 250 or a transport node (not illustrated), may be defined. Each traffic class 50 may correspond to a certain Quality of Service (QoS) level. For example, the voice traffic class may have a higher QoS level than the internet traffic class.

According to embodiments of the present invention, classification of UL data traffic in the communication device 100 is accomplished by detecting identifiers of outgoing UL data packets which are complementary to identifiers of incoming DL data packets. The DL data packets are already assigned to the traffic classes 50, e.g. by a traffic classificator 210 of the network node 220, which operates on the basis of DL packet classification rules 215. In the illustrated example, the traffic classificator 210 of the network node 220 is controlled by the control node 300, e.g. on the basis of policy data. The outgoing UL data packets carrying the complementary identifier are assigned to the same traffic class 50 as the incoming DL data packets. For this purpose, the communication device 100 is provided with a traffic classificator 110, which can be operated in a reflective mode. In the reflective mode, the traffic classificator 110 monitors the DL data packets so as to locally generate UL packet classification rules 115.

In the communication device 100, the traffic class 50 to which the DL data packets are assigned may be detected on the basis of a marking of the DL data packets. Monitoring of the DL data packets may be accomplished by identifying a source of the received DL data packets, e.g. on the basis of a source identifier in the data packets. For example, the source identifiers may be source IP addresses. This information is then used to locally generate the UL packet classification rules 115. The UL packet classification rules operate to assign the UL data packets, which are directed to the identified source, to the same traffic class 50 as the DL data packets from this source. The classified UL data packets are marked according to the traffic class they are assigned to, e.g. using the same marking as in the DL data packets.

In the following, the reflective mode of the traffic classificator 110 will be explained in more detail by referring to exemplary structures of data packets and protocol frames used in transmitting the data packets.

Figure 3:
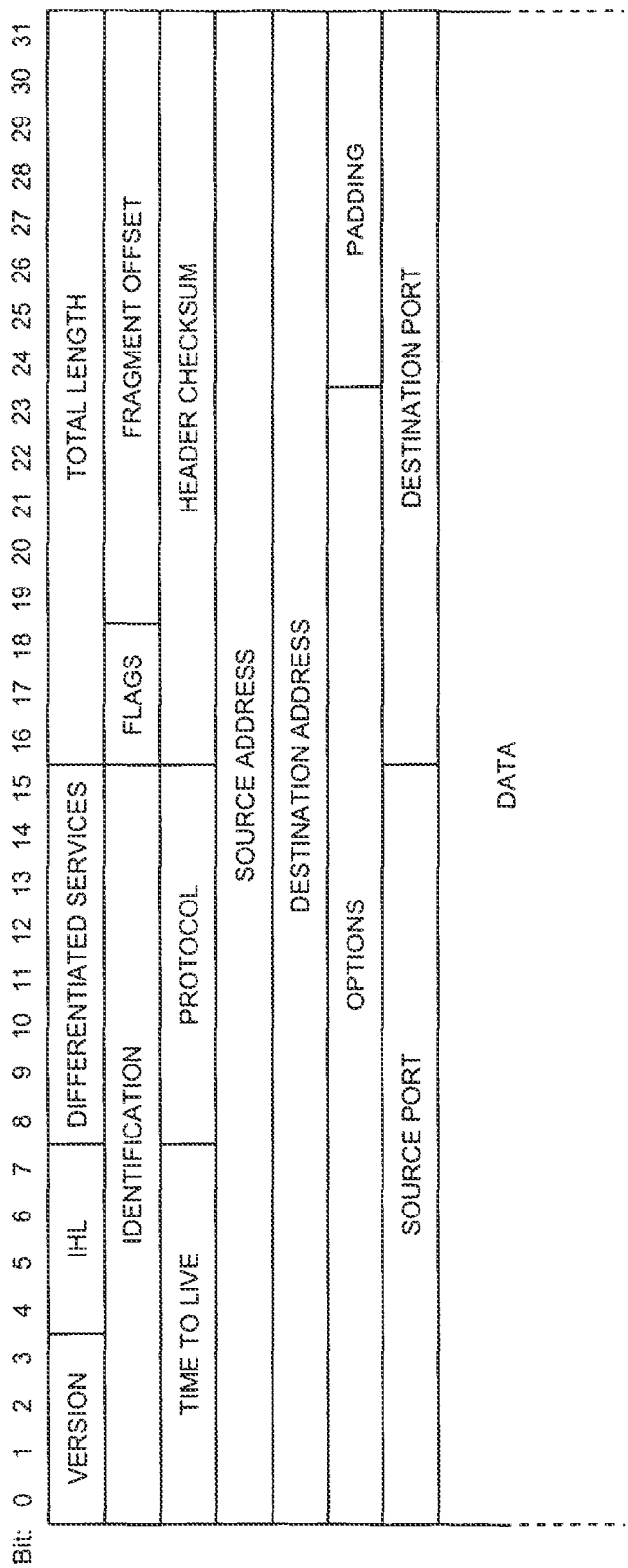
FIG. 3 schematically illustrates an example of a data packet as used in an embodiment of the invention.

FIG. 3 schematically illustrates IP data packets of the IP version 4 type. As illustrated, a header section of the data packets includes several information fields, which are referred to as "Version", "IHL (IP Header Length)", "Differentiated Services", "Total Length", "Identification", "Flags", "Fragment Offset", "Time to Live", "Protocol", "Header Checksum" "Source Address", "Destination Address", "Options", and "Padding". Details concerning these fields are defined in the RFC 791 Specification. The information field termed as "Differentiated Services" is defined in the RFC 2475 Specification. In addition, the header section of an IP data packet will also include information fields which are referred to as "Source Port" and "Destination Port". Corresponding information fields are defined, for example, by the Transport Control Protocol (TCP) defined in the RFC 793 Specification and the User Datagram Protocol (UDP) as defined in the RFC 768 Specification.

Following the header section, IP data packets are typically provided with a data section, in which different types of payload data traffic may be included.

Figure 4:
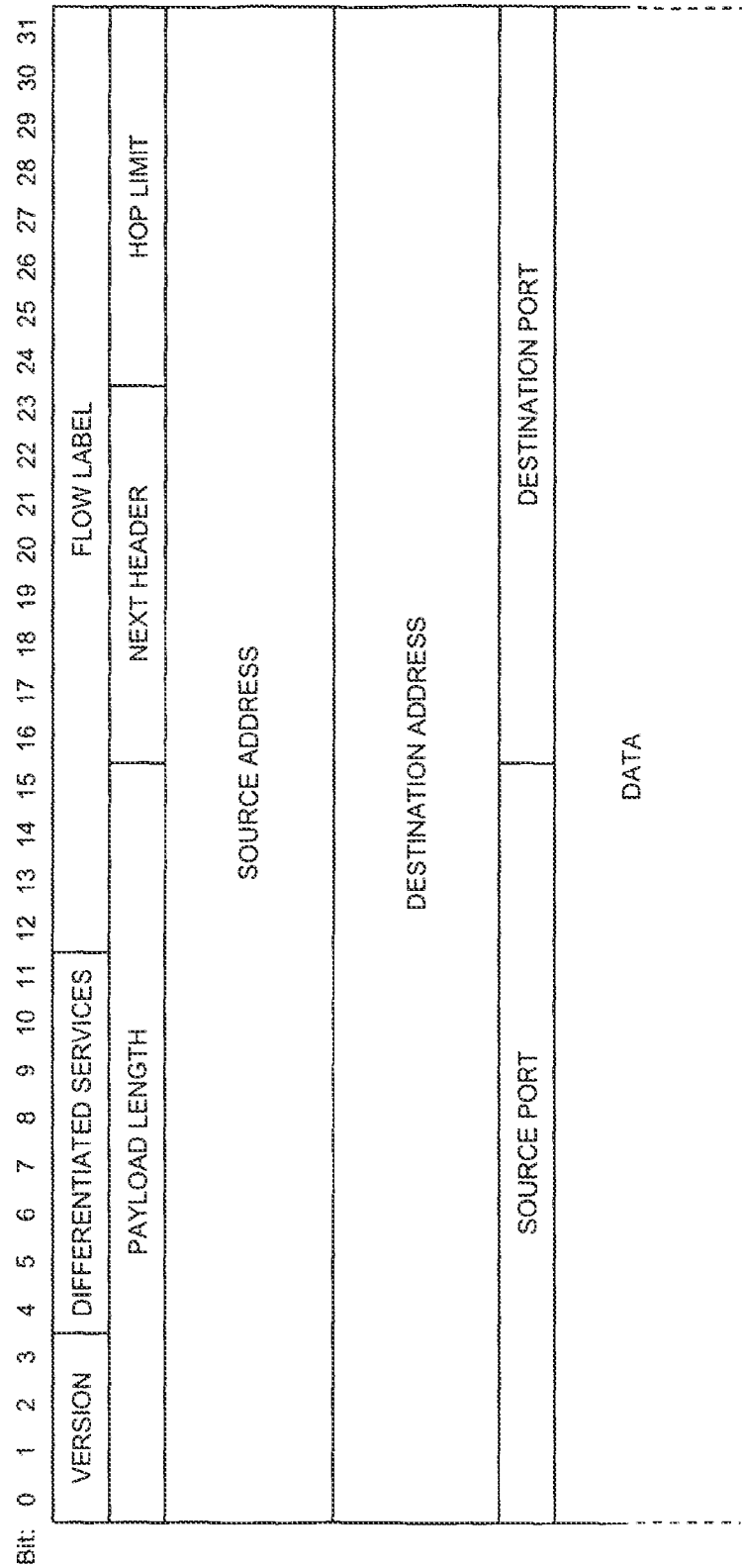
FIG. 4 schematically illustrates a further example of a data packet as used in an embodiment of the invention.

FIG. 4 schematically illustrates IP data packets according to the IP version 6 type. Again, the header section includes a number of information fields, which are referred to as "Version", "Differentiated Services", "Flow Label", "Payload Length", "Next Header", "Hop Limit", "Source Address", and "Destination Address". This structure of the header section is defined in the RFC 2460 Specification. In addition, the header section may also comprise information fields termed as "Source Port" and "Destination Port", e.g. as defined by the TCP or UDP. Again, the header section will typically be followed by a data section which may carry various types of payload data.

For the purposes of the present disclosure, only the information fields referred to as "Differentiated Services", "Source Address", "Destination Address", "Source Port", and "Destination Port" will be further discussed. As regards the other information fields, further explanations can be taken from the above-mentioned RFC Specifications.

The information field "Source Address" indicates the IP address from which a data packet originates. Similarly, the information field "Destination Address" indicates the IP address for which the data packet is destined. In IP version 4, the source address and the destination address are 32 bit values. In IP version 6, the source address and the destination address are 128 bit values.

The information field "Source Port" indicates a port number at the source of the data packet, whereas the information field "destination port" indicates a port number at the destination point of the data packet.

On the basis of the source address, the destination address, the source port, and the destination port, an IP packet flow can be defined as a flow of IP packets between a first endpoint defined by the source address and the source port, and a second endpoint defined by the destination address and the destination port. An entity including the source address, the destination address, the source port, the destination port and a protocol identifier is also referred to as "IP 5-tuple".

The information field "Differentiated Services" is included in both IP version 4 data packets and in IP version 6 data packets. As defined in the RFC 2474 Specification, the information field "Differentiated Services" is an 8 bit value. The structure of this information field is schematically illustrated in FIG. 5.

Figure 5:
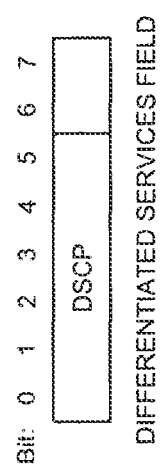
FIG. 5 schematically illustrates an identifier and a complementary identifier in data packets.

As illustrated in FIG. 5, six bits of the information field, i.e. bits 0-5, are used to define the Differentiated Services Code Point (DSCP). The other two bits are unused. Using the DSCP, forwarding of the data packets by network nodes may be controlled. For data packets pertaining to different types of services different forwarding procedures may be selected. DSCPs may be standardized. Further, a range of non-standardized DSCPs is available.

Figure 6:
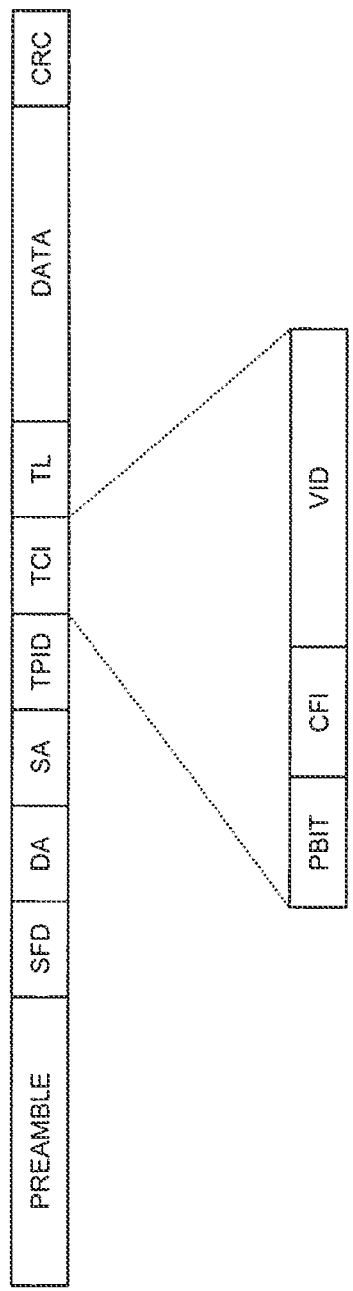
FIG. 6 schematically illustrates an information field in a header section of data packets.

FIG. 6 schematically illustrates the structure of a protocol frame according to the IEEE 802.1q and 802.1p standards. The protocol frame is used on the media access control (MAC) layer and may be used to transmit the IP packets as explained in connection with FIGS. 3, 4 and 5. The IP data packet would then be included into a data field of the protocol frame.

The protocol frame starts with a preamble, which is an alternating pattern of ones and zeros. The length of the preamble is seven bytes. The preamble is followed by a start-of-frame delimiter (SFD). The start-of-frame delimiter has a length of one byte and includes am alternating pattern of ones and zeros, ending with two consecutive ones. The start-of-frame delimiter is followed by six bytes defining a destination MAC address (DA) of the protocol frame and by six bytes defining a source MAC address (SA) of the protocol frame. The next field includes a tagging protocol identification (TPID). A hexadecimal value of 8100 indicates the IEEE 802.1q/p protocol. The next field includes tag control information (TCI). As illustrated in the lower part of FIG. 6, the tag control information includes three priority bits, followed by one bit defined as canonical format indicator (CFI) and twelve bits of a virtual local area network identification (VLAN ID). The TCI field may also be referred to as VLAN tag. The TCI field is followed by a Type Length field, of two bytes length. This field indicates the number of MAC client data bytes contained in the data field of the protocol frame or the frame type identification if the frame is assembled using an optional format. The Type Length field is followed by the data field, which may be a sequence of 48 to 1500 bytes length. The data field is followed by a cyclic redundancy check (CRC) value, which is generated by the MAC source device and is used by the MAC destination device to check the integrity of received protocol frames.

In the TCI field, the priority bits define a user priority. Details concerning the mapping of the settings of the priority bits to user priorities are defined in the IEEE 802.1p standard. The CFI bit is used to provide compatibility with both Ethernet and Token Ring type networks. The VLAN ID is used to distinguish between different virtual local area networks (VLANs).

According to concepts as described herein, information in DL data packets is used in the communication device 100 to locally generate packet classification rules for UL data packets. Here, it is to be noted that in many practical scenarios, a flow of IP data packets is typically bi-directional. Even if the transport of payload data occurs in only one direction, e.g. on the basis of TCP packets, the IP packet flow will typically also include control packets, e.g. TCP acknowledgement packets, transmitted in the opposite direction. Further, the source and destination IP addresses and port numbers of an IP packet flow are typically symmetrical, i.e. the destination endpoint (identified by an IP address and port number) in one direction is the same as the source endpoint (identified by IP address and port number) in the other direction, and vice versa. Due to the symmetry, oppositely flowing packets of the same IP packet flow will have "complementary" address identifiers, and "complementary" port identifiers, which means that the source identifier in one direction is the same as the destination identifier in the other direction.

According to the concepts as explained in the following, it will be assumed that the DL data traffic are in some way assigned to the traffic classes 50 and provided with a corresponding marking. This may be accomplished by the traffic classificator 210 of the network gateway node 220. In the illustrated example, the control node 300 signals the DL packet classification rules 215 to the network gateway node 220. However, other way of providing the DL packet classification rules 215 to the network gateway node 220 may be used as well. Using the DL packet classification rules 215, the traffic classificator 210 in the network gateway node 220 assigns the DL packets to the traffic classes 50 and marks the DL data packets accordingly. This marking may be accomplished by setting the DSCP field in the header of the data packets, by setting priority bits of the data packets, and/or by providing the data packets with a VLAN tag. Further, if the outgoing data packets are to be transmitted using a tunneling protocol, this marking of the outgoing data packets may also be accomplished by providing the data packets with a tunnel identification.

As explained above, the communication device 100 includes the traffic classificator 110 operating on the basis of UL packet classification rules 115 and supporting a reflective mode of generating the UL packet classification rules. In the reflective mode, the traffic classificator 110 is configured to detect incoming data packets including a first identifier and outgoing data packets including a second identifier which is complementary with respect to the first identifier. In the complementary second identifier, a destination endpoint element, e.g. destination IP address and/or destination port, is the same as a source endpoint element, e.g. source IP address and/or source port, in the first identifier. The first and the second identifier may each be the IP 5-tuple. By monitoring the received DL data packets, the traffic classificator 110 generates the UL packet classification rules 115 in such a way that the outgoing data packets having the complementary second identifier are assigned to the same traffic class 50 as the incoming data packets having the first identifier. In this way, it is not required to explicitly signal the UL packet classification rules 115 to the communication device 100. On the other hand, the UL packet classification rules 115 can be flexibly adapted to specific communication scenarios, which can be controlled by the network operator through the DL traffic classification.

In the reflective mode, if the traffic classificator 110 detects a new IP packet flow with incoming data packets in the DL direction, it can automatically generate a corresponding UL packet classification rule 115. If the incoming data packets of the IP packet flow each carry a specific IP 5-tuple, the UL packet classification rule 115 will be configured to assign outgoing data packets carrying a complementary IP 5-tuple to the same traffic class 50 as the incoming data packets are received. Further, the UL data packets are marked according to their classification, e.g. by using the same marking as in the DL data packets of this traffic class. This marking may be accomplished by setting the DSCP field in the header of the data packets, by providing the data packets with a VLAN tag, and/or by setting priority bits of the data packets. Further, if the outgoing data packets are to be transmitted using a tunneling protocol, this marking of the outgoing data packets may also be accomplished by providing the data packets with a tunnel identification.

The structure of an identifier and a complementary identifier, which are based on the IP 5-tuple, are illustrated in FIG. 7. However, it is to be understood that other types of identifiers and complementary identifiers are possible as well. In general, in the complementary identifier at least one element of identifier reappears as another element. For example, in the complementary identifier of the outgoing data packet the source element of the identifier in the incoming data packet may reappear as a destination element. According to an embodiment, the identifier includes a source address and a destination address and the complementary identifier includes a source address corresponding to the destination address of the identifier and a destination address corresponding to the source address of the identifier.

As shown in FIG. 7, an identifier on the basis of the IP 5-tuple may include a source address A, a destination address B, a source port C, a destination port D, and a protocol identifier X. The corresponding complementary identifier will then have a source address B, a destination address A, a source port D, a destination port C, and a protocol identifier X. In other words, in the complementary identifier the source address and the destination address are swapped as compared to the identifier. Similarly, in the complementary identifier the source port and the destination port are swapped as compared to the identifier. The protocol identifier remains unchanged. In other embodiments, different types of identifier and complementary identifier may be used, e.g. on the basis of only a part of the IP 5-tuple. For example, in the complementary identifier, only the source address and the destination address could be swapped as compared to the identifier.

In the following, a process of handling UL data packets in accordance with an embodiment of the invention will be explained in more detail by referring to the structures as shown in FIG. 1.

Initially, UL data packets, e.g. data packets relating to a specific service such as a Voice over IP service, may be transmitted from communication device 100 to the network gateway 220 while being assigned to a default traffic class among the traffic classes 50, e.g. the internet traffic class. The corresponding IP packet flow will then also include data packets transmitted in the DL direction, e.g. acknowledgement packets. Using the DL packet classification rules 215, the traffic classifier 210 in the network gateway node 220 will assign these DL data packets to a desired traffic class, e.g. voice traffic, and will accomplish a corresponding marking of the DL data packets. As mentioned above, this marking may involve setting the DSCP field in the header of the DL data packets, providing the DL data packets with a VLAN tag, providing the DL data packets with a tunnel identification, and/or setting priority bits of the DL data packets.

In the reflective mode, the traffic classifier 110 in the communication device 100 then detects the incoming DL data packets and generates a UL traffic classification rule 115, operating on the basis of an IP 5-tuple which is complementary to an IP 5-tuple in the received incoming data packets. Here, it is to be understood that different IP packet flows may have the same traffic class 50 and that multiple UL packet classification rules 115 may be used for assigning outgoing UL data packets to one traffic class 50.

In addition to the reflective mode of generating the UL packet classification rules 115, the traffic classifier 110 may also be provided with other traffic classification modes, e.g. operating on the basis of UL packet classification rules signaled from the network, operating on the basis of statically configured UL packet classification rules, or operating on the basis of port mapping. The reflective mode may be activated in response to receiving a control signal from the network, e.g. when initializing the connection between the communication device 100 and the network gateway node 220 or in an update procedure.

The communication device 100 may also be provided with a functionality to indicate to the communication network that it supports the above-described reflective mode of generating the UL classification rules 115. For example, this could be included into connection initialization between the communication device 100 and the network gateway node 220. By way of example, an information element could be added to the signaling used during connection initialization. By means of this information element, the communication device 100 can indicate that it supports the reflective mode. And the network can signal to the communication device 100 whether the reflective mode should be used.

In some embodiments, the information that the communication device 100 supports the reflective mode of generating the UL classification rules 115 may also be distributed between network nodes, e.g. to the control node 300.

According to some embodiments, the reflective mode of generating the UL classification rules 115 may be selectively activated for a subgroup of the traffic classes 50, e.g. for only one traffic class. For example, the reflective mode could be activated only for voice traffic and/or multimedia traffic. This may be useful if not all applications or services require the reflective mode to be activated. For example, in some cases the IP 5-tuple in data packets of a service may be statically defined and a corresponding static UL packet classification rule 115 may be used in the communication device 100. Also, port mapping could be used for some of the traffic classes 50, while traffic classification to one or more other traffic classes is accomplished in the reflective mode.

In some embodiments, the network can signal to the communication device 100 whether the reflective mode of generating the UL classification rules 115 should be applied or not, e.g. using corresponding signaling on the link between the network gateway node 220 and the communication device 100. In such cases, the signaling from the communication device 100 to the communication network that the reflective mode is supported could be implemented on a per traffic class basis as well. That is to say, the corresponding signaling could specify support of the reflective mode for a certain traffic class or group of traffic classes, e.g. voice traffic and multimedia traffic.

Figure 8:
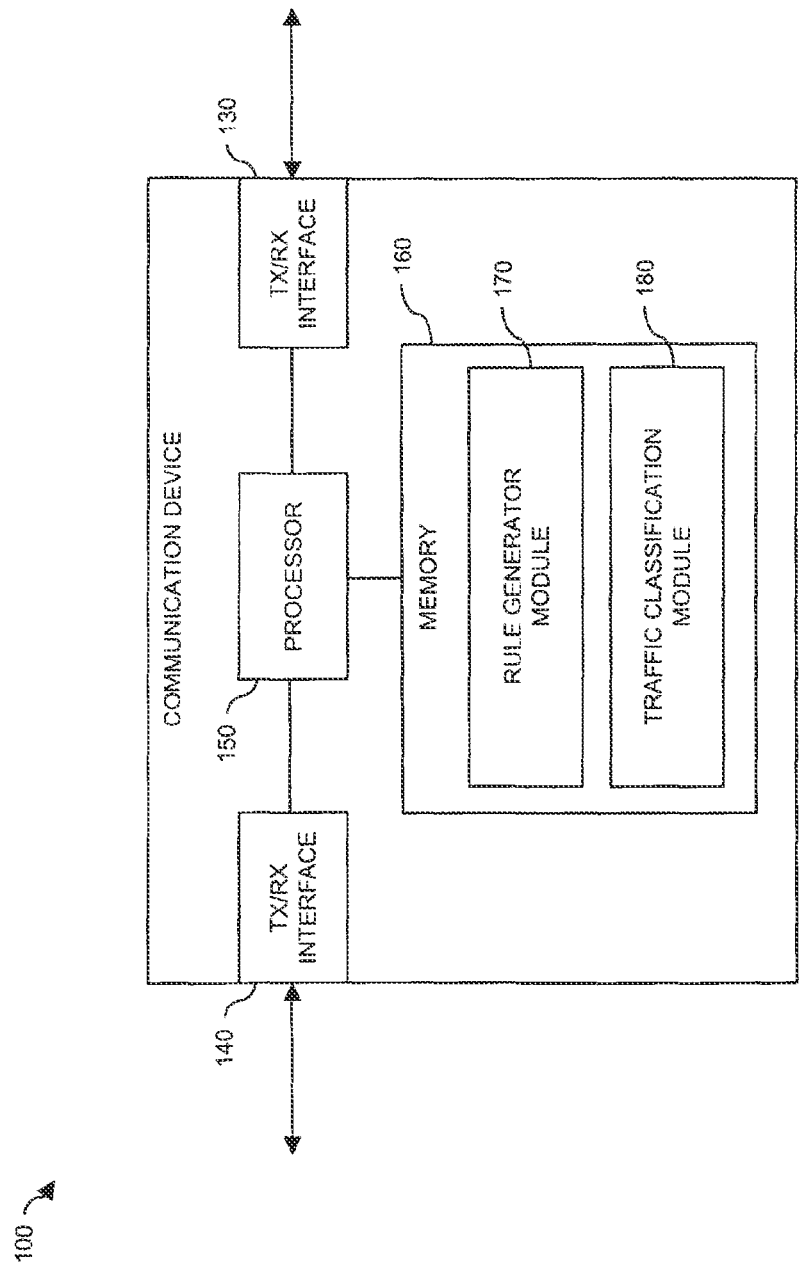
FIG. 8 schematically illustrates an implementation of a communication device according to an embodiment of the invention.

FIG. 8 further illustrates an exemplary implementation of the communication device 100. As explained above, the communication device may be a mobile terminal, e.g. the UE 40 explained in connection with FIG. 1, or a residential gateway, e.g. the RG 35 as explained in connection with FIG. 1.

According to the illustrated implementation, the communication device 100 includes at least a first interface 130 for coupling to the network gateway node 220 via the fixed access node 250. The interface 130 is implemented as a bidirectional interface, i.e. includes a receive (RX) interface for receiving DL data packets and a transmit (TX) interface for transmitting UL data packets. In some embodiments, e.g. if the communication device is implemented as a residential gateway, it may also include at least one second interface 140 for coupling to other devices, e.g. to the subscriber premises devices as illustrated in FIG. 1. The second interface 140 may be implemented as a bidirectional interface as well, i.e. include a receive (RX) interface and a transmit (TX) interface. Further, the communication device 100 includes a processor 150 coupled to the interface(s) 130, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities of the communication device 100. More specifically, the memory 160 may include a rule generator module 170 configured to implement the reflective mode of generating the UL packet classification rules and a traffic classification module 180 configured to classify the outgoing UL data packets in the above-described manner by applying the UL packet classification rules, and to mark the outgoing UL data packets accordingly. Accordingly, the traffic classifier 110 may be implemented by having the processor 150 execute the rule generator module 170 and the traffic classification module 180.

It is to be understood that the structure as illustrated in FIG. 8 is merely schematic and that the communication device 100 may actually include further components which, for the sake of clarity, have not been illustrated. Also, it is to be understood that the memory 160 may include further types of program code modules, which have not been illustrated, e.g. program code modules for implementing known functionalities of a mobile terminal or of a residential gateway.

FIG. 9 shows a flowchart illustrating a method 900 for handling UL data traffic, which may be used to implement the above-mentioned concepts. The method may be implemented in a communication device having access to a communication network via a fixed access, e.g. in the UE 40 or the RG 35 of FIG. 1.

In step 910, incoming data packets with a first identifier are received in the communication device. The data packets are received via the fixed access. For this purpose, the communication device may be coupled to the fixed access via an intermediate fixed access node. The data packets are identified by a first identifier, e.g. an IP 5-tuple or other identifier including a destination address identifier and a source address identifier. Further, the incoming data packets are associated with a traffic class, e.g. by a marking provided in the data packets.

In step 920, outgoing data packets with a complementary second identifier are detected.

In step 930, outgoing data packets with the second identifier are assigned to the same traffic class as the incoming data packets with the first identifier.

The detecting of outgoing data packets in step 920 and assigning to the same traffic class in step 930 may be accomplished on the basis of a packet classification rule. The packet classification rule may be generated in the communication device by monitoring the received incoming data packets.

Then, in optional step 940, the outgoing data packets may be provided with a marking which indicates the traffic class the outgoing data packets have been assigned to. This marking may be accomplished by setting a DSCP of the outgoing data packets, by setting priority bits of the outgoing data packets, and/or by including a VLAN tag or a tunnel identification into the outgoing data packets. The priority bits may be part of the VLAN tag.

According to the concepts as explained above, dynamic assignment of outgoing data traffic from a communication device to a desired traffic class is possible without requiring complex signaling to the communication device. The assignment may be adapted according to operating conditions or on the basis of policy data, e.g. on the basis of user-specific policies data and/or, if the outgoing data traffic relates to a specific service, on the basis of service-specific policies. Further, the assignment could be dependent on the time of day, the day of week or other parameters. A variety of different policies may thus be defined for controlling the assignment of the data traffic to a traffic class. One such policy may even be to block data traffic relating to a specific service.

It is to be understood that the concepts as explained above are merely exemplary and susceptible to various modifications. For example, the network nodes as illustrated in FIGS. 1 and 2 need not be implemented as separate nodes, but two or more nodes may be integrated into a single component. The concepts may be applied in various types of communication networks and in various types of communication devices. In addition or as an alternative to IP 5-tuples, other identifiers and complementary identifiers may be used as well to implement the concepts. The concepts may be implemented by dedicated hardware and/or by software to be executed by a multipurpose processor in one of the involved nodes.

What is claimed is:

1. A method of handling network traffic in a terminal device, comprising:
   receiving, from a remote device via a fixed access to a network, a downlink data packet comprising a packet header, the packet header comprising a source address of the remote device, a destination address of the terminal device, and a traffic class indicator;
   deriving an uplink packet classification rule based on which of a plurality of protocols supported by the terminal device the downlink data packet conforms to;
   selectively marking outgoing uplink data packets in accordance with the uplink packet classification rule such that the outgoing uplink data packets that are destined for the source address of the remote device are marked with the traffic class indicator of the downlink data packet; and
   transmitting the selectively marked outgoing uplink data packets to the remote device via the fixed access.

2. The method of claim 1, further comprising:
   receiving, from a further remote device via the fixed access to the network, a further downlink data packet that:
      conforms to one of the plurality of protocols different from the downlink data packet; and
      comprises a further traffic class indicator;
   deriving a different uplink packet classification rule based on the different protocol that the further downlink data packet conforms to; and
   selectively marking the outgoing uplink data packets in accordance with the different uplink packet classification rule such that the outgoing uplink data packets that are destined for the further remote device are marked with the further traffic class indicator of the further downlink data packet.

3. The method of claim 1, wherein selectively marking comprises setting a Differentiated Services Code Point field of the selectively marked outgoing uplink data packets.

4. The method of claim 1, wherein selectively marking comprises setting priority bits of the selectively marked outgoing uplink data packets.

5. The method of claim 1, wherein selectively marking comprises providing the selectively marked outgoing uplink data packets with a virtual local area network tag.

6. The method of claim 1, wherein selectively marking comprises providing the selectively marked outgoing uplink data packets with a tunnel identifier.

7. The method of claim 1, wherein selectively marking comprises providing the selectively marked outgoing uplink data packets with a virtual local area network tag.

8. The method of claim 1, further comprising activating the selective marking responsive to a control signal received from the network via the fixed access.

9. The method of claim 1, further comprising transmitting, to the network via the fixed access, an indication that the terminal device supports the selective marking.

10. A terminal device comprising:
    interface circuitry configured to receive, from a remote device via a fixed access to a network, a downlink data packet comprising a packet header, the packet header comprising a source address of the remote device, a destination address of the terminal device, and a traffic class indicator;
    processing circuitry configured to:
        derive an uplink packet classification rule based on which of a plurality of protocols supported by the terminal device the downlink data packet conforms to;
        selectively mark outgoing uplink data packets in accordance with the uplink packet classification rule such that the outgoing uplink data packets that are destined for the source address of the remote device are marked with the traffic class indicator of the downlink data packet; and
        transmit the selectively marked outgoing uplink data packets to the remote device via the fixed access using the interface circuitry.

11. The terminal device of claim 10, wherein:
    the interface circuitry is further configured to receive, from a further remote device via the fixed access to the network, a further downlink data packet that:
        conforms to one of the plurality of protocols different from the downlink data packet; and
        comprises a further traffic class indicator;
    the processing circuitry is further configured to:
        derive a different uplink packet classification rule based on the different protocol that the further downlink data packet conforms to; and
        selectively mark the outgoing uplink data packets in accordance with the different uplink packet classification rule such that the outgoing uplink data packets that are destined for the further remote device are marked with the further traffic class indicator of the further downlink data packet.

12. The terminal device of claim 10, wherein to selectively mark, the processing circuitry is configured to set a Differentiated Services Code Point field of the selectively marked outgoing uplink data packets.

13. The terminal device of claim 10, wherein to selectively mark, the processing circuitry is configured to set priority bits of the selectively marked outgoing uplink data packets.

14. The terminal device of claim 10, wherein to selectively mark, the processing circuitry is configured to provide the selectively marked outgoing uplink data packets with a virtual local area network tag.

15. The terminal device of claim 10, wherein to selectively mark, the processing circuitry is configured to provide the selectively marked outgoing uplink data packets with a tunnel identifier.

16. The terminal device of claim 10, wherein to selectively mark, the processing circuitry is configured to provide the selectively marked outgoing uplink data packets with a virtual local area network tag.

17. The terminal device of claim 10, wherein the processing circuitry is further configured to activate the selective marking responsive to a control signal received from the network via the fixed access.

18. The terminal device of claim 10, wherein the interface circuitry is further configured to transmit, to the network via the fixed access, an indication that the terminal device supports the selective marking.

19. A non-transitory computer readable medium storing a computer program product for controlling a terminal device, the computer program product comprising software instructions which, when run on a processor of the terminal device, causes the terminal device to:
    receive, from a remote device via a fixed access to a network, a downlink data packet comprising a packet header, the packet header comprising a source address of the remote device, a destination address of the terminal device, and a traffic class indicator;
    derive an uplink packet classification rule based on which of a plurality of protocols supported by the terminal device the downlink data packet conforms to;
    selectively mark outgoing uplink data packets in accordance with the uplink packet classification rule such that the outgoing uplink data packets that are destined for the source address of the remote device are marked with the traffic class indicator of the downlink data packet; and
    transmit the selectively marked outgoing uplink data packets to the remote device via the fixed access.

* * * * *

UNITED STATES PATENT AND TRADEMARK OFFICE
CERTIFICATE OF CORRECTION

PATENT NO.        : 11,558,879 B2
APPLICATION NO.   : 17/186617
DATED             : January 17, 2023
INVENTOR(S)       : Ludwig et al.

It is certified that error appears in the above-identified patent and that said Letters Patent is hereby corrected as shown below:

In the Specification

In Column 1, Line 7, delete "2019," and insert -- 2019, patented as U.S. patent Ser. No. 10,939,456, --, therefor.

In Column 1, Line 9, delete "10/492,207," and insert -- 10,492,207, --, therefor.

In Column 2, Line 27, delete "traffic classificatory" and insert -- traffic classificator --, therefor.

In Column 2, Line 32, delete "according an" and insert -- according to an --, therefor.

In Column 4, Line 23, delete "i.e" and insert -- i.e. --, therefor.

In Column 6, Line 2, delete "Checksum" "Source" and insert -- Checksum", "Source --, therefor.

In Column 6, Line 10, delete "Transport" and insert -- Transmission --, therefor.

In Column 7, Line 14, delete "am alternating" and insert -- an alternating --, therefor.

Signed and Sealed this
Seventeenth Day of October, 2023

Katherine Kelly Vidal
*Director of the United States Patent and Trademark Office*